Patented Oct. 29, 1940

2,219,379

UNITED STATES PATENT OFFICE 2,219,379

CATALYTIC PROCESS AND CATALYST THEREFOR

Albert Smith Carter, Wilmington, Del., assignor to E. I. du Pont de Nemours & Company, Wilmington, Del., a corporation of Delaware No Drawing. Application June 30, 1939, Serial No. 282,059

11 Claims. (Cl. 260—678)

This invention relates to improvements in the manufacture of vinylacetylene by polymerization of acetylene and in improved catalysts for the same; more particularly, it deals with improvements in rate of acetylene polymerization and yield resulting from the addition of salts acting as promoters.

Numerous patents have disclosed methods of forming the vinylacetylenes, particularly 1-butene-3-yne, 1,5-hexadiene-3-yne, 1,3-hexadiene-5-yne and 1,3,7-octatriene-5-yne by the polymerization of acetylene in the presence of slightly acid solutions of cuprous chloride in which the solubility is maintained through the use of ammonium chloride, nitrogenous bases, alkali or alkaline earth salts. These catalysts may be aqueous solutions as in U. S. P. 1,876,857 or they may be non-aqueous systems as disclosed in U. S. P. 1,926,039. In general, it has been found that the activity of catalysts of this type possess improved activity and productive life if maintained slightly acid, as disclosed in U. S. P. 1,926,056.

Batch processes for the polymerization of acetylene provide only poor yields of vinylacetylene owing to the simultaneous production of divinylacetylene. A continuous process has been described in U. S. P. 2,048,838, which makes it possible to take advantage of the maximum vinylacetylene production of such catalyst systems by separating the vinylacetylene before substantial amounts of divinylacetylene have been formed and returning the unconverted acetylene to the reaction zone. The process of this patent, however, is developed on the principle that the ratio of divinylacetylene to vinylacetylene increases with increase in conversion per cycle through the reaction, therefore, to minimize the production of divinylacetylene, it is necessary to operate with a partial conversion and recirculate a relatively large portion of the acetylene through the zone.

An object of the present invention is to discover agents which will permit the conversion of higher percentages of acetylene to vinylacetylene without decrease in yield to by-product acetylene trimers and tetramers. A further object of this invention is to improve the rate of reaction of the catalytic material to increase its hourly output per unit of catalyst mass, without decrease in yield.

These objects have been accomplished by the addition of soluble salts of tin to an otherwise standard cuprous chloride catalyst composition. Moreover, purification of acetylene as hereinafter disclosed contributes to the improved result.

The following examples, wherein the term "parts" refer to "parts by weight," illustrate but do not limit the invention.

Example 1

The following catalyst solution was compounded.

|   | Parts |
|---|---|
| Cuprous chloride | 1110 |
| Precipitated copper | 100 |
| Ammonium chloride | 545 |
| Water | 830 |

This mixture was aged at 65° under nitrogen until completely reduced and then acidified with hydrochloric acid until the pH dropped to 1. This was then operated with pure acetylene in the cyclic vinylacetylene process described by Carter and Downing in U. S. P. 2,048,838, the products being condensed at −70° under an absolute pressure of 30 lbs. per sq. in. After removal of acetylene (which was returned to the reactor) and the products measured and analyzed, it was found that 71 parts (by weight) of acetylene had been reacted per hour and the ratio of vinylacetylene to divinylacetylene and higher polymers was 11.9.

A second catalyst was compounded in the manner of the above, but 105 parts of SnCl$_2$.2H$_2$O was added before adjustment of acidity. Upon operating this catalyst in an identical manner, the production was 77 parts of acetylene reacted and the ratio of vinylacetylene to higher products was 16.3.

Example 2

The following catalyst was compounded, aged and acidified in the manner of the previous example:

|   | Parts |
|---|---|
| Potassium chloride | 1300 |
| Cuprous chloride | 1980 |
| Precipitated copper | 200 |
| Water | 1400 |

Operating as before on purified acetylene, the production was found to be 155 parts of reacted acetylene per hour at a ratio of vinylacetylene to higher polymers of approximately 9. Addition of 190 parts of SnCl$_2$.2H$_2$O before aging and acidification resulted in a production of 160 parts of acetylene reacted and a ratio of products of 16.

In the above examples, approximately 12% of the acetylene introduced into the catalyst zone was reacted per cycle. As is well known, the production of higher polymers increases with increase in this conversion, therefore, to obtain the correct evaluation of the influence of an added salt, it is necessary to operate at essentially the same conversion per cycle as has been done in the above experiments. For example, in a typical plant operation, using the catalyst of Example 2, the ratio of products without addition of tin may be about 6.5, obtained at a conversion of approximately 15%, and the stannous chloride addition under these conditions of operation and conversion results in a ratio of about 12.

It will be noted that the addition of the stannous salt has been made before the acidity of the catalyst is adjusted by addition of HCl. It is desirable to operate these catalysts at about the same acidity as the unpromoted catalysts, therefore the same acidity adjustment is made after the salt is added in view of the fact that it may be strongly acid by hydrolysis.

In the manufacture of vinylacetylene and in tests to demonstrate catalyst efficiency, it has been found advisable to purify the acetylene by the removal of oxygen, hydrogen sulfide, arsine and particularly phosphine. These are common impurities in commercial acetylene, particularly in the gas obtained directly from carbide generators, and all have been found to have a deleterious effect upon capacity and active life of catalysts used in the manufacture of vinylacetylene. Oxygen, which may result in explosive products as well as destroy the activity of the catalyst, may be removed by scrubbing the gas with an alkaline solution of sodium hydrosulfite containing the sodium salt of anthraquinone beta sulfonic acid. For example, a suitable scrubber for oxygen removal may consist of the following composition:

Dissolve 450 parts of potassium hydroxide (or an equivalent weight of sodium hydroxide) in 3000 parts of water and add this to 3 parts of sodium anthraquinone beta-sulfonate, then add 225 parts of sodium hydrosulfite ($Na_2S_2O_4$). The solution should be prepared and stored under an inert atmosphere to prevent its deterioration before use.

This alkaline solution, or any suitable solution of sodium or potassium hydroxide will serve for the removal of hydrogen sulfide. Arsine is also removed to a large extent by these alkaline scrubbers, and any which remains unremoved, is removed by the treatment for removal of phosphine. Phosphine may be removed by any of the well known methods, for example, by treatment of the gas with acidified cuprous chloride, either in solution or mounted on such materials as pumice; by treatment with hypochlorites in any of the well known systems; or it may be removed with iodine solutions; but most practical in many respects has been found the removal with strong sulfuric acid. Sulfuric acid removes phosphine and its effectiveness increases with increase in concentration, being particularly active in concentrations between 88 and 98%. Frequently it will prove desirable to remove phosphine in the wet gas directly from the generators or from a gasometer, and subsequently scrub for the removal of oxygen and other impurities, thereby insuring that any traces of oxygen which might be introduced with the sulfuric acid scrubbing are removed just before the gas is introduced into the reaction zone. For this purpose, we have found it convenient to scrub the gas with dilute sulfuric acid in order to dry it prior to scrubbing with strong sulfuric acid for phosphine removal. Sulfuric acid used in the drying scrubber may, for example, be 50 to 80% in strength. The minimum concentration may be based upon the limitations of the corrosion resistance of the materials of construction, for example, iron. Each of these scrubbers may be of any conventional design, for example, they may be packed towers, through which the scrubbing liquid is pumped either con- or countercurrent to the flow of gas. They may be jacketed or the scrubbing solution may be passed through a heat exchanger prior to entrance to the tower for adjustment of temperature. There are no critical temperature limitations on any of the scrubber solutions, but it is obvious that they should be heated sufficiently in cold weather that the solutions do not freeze, and that they should not be allowed to become so warm either by absorption of water or gas that they have an excessive vapor pressure or undergo chemical reaction. It is convenient to operate above the freezing point and below 40–45° C. for example. The strong sulfuric acid used for phosphine removal may slowly react with acetylene evolving traces of sulfur dioxide which must be subsequently removed in an alkaline scrubber, and also tar will slowly form in the strong sulfuric acid which will necessitate its removal and the use of fresh acid.

In a typical vinylacetylene operation, and for the purpose of the examples given above, a satisfactory system of purification of the acetylene used may consist of the following steps:

1. Acetylene from generators or gasometer supplied to scrubber system through water seals and pumps.
2. Gas scrubbed with sulfuric acid of 60–80% strength, at 30° C.
3. Gas scrubbed with sulfuric acid of 90–96% strength, at 30° C.
4. Gas scrubbed with 15% sodium hydroxide solution.
5. Gas scrubbed with sodium hydrosulfite solution (above).

In the operation of a typical vinylacetylene process using a catalyst consisting of a 70% solution of $Cu_2Cl_2.1.75KCl$ in water reduced and adjusted to pH as described in copending application Serial No. 210,159, operating on purified acetylene at 65° C., the production of acetylene polymers may be 58 to 61 grams per liter of catalyst per hour, and this production will be sustained for several months without decrease. However, if the same catalyst is operated under the same conditions but instead on crude acetylene directly as received from the generators, containing possibly 0.04% phosphine, the same initial production capacity will be observed, but it will slowly decrease and the color of the catalyst will change from brilliant yellow to a dirty green. By the end of a month's operation, the production capacity of the catalyst may be reduced as much as 50%. In a typical plant operation, without other change, removal of phosphine from the acetylene resulted in a monthly increase in production of between 10 and 20%, and the economical operating period of the catalyst was increased from one month to several months.

The usual vinylacetylene catalyst contains a high concentration of the chloride ion, being generally composed of cuprous chloride and a chloride of a nitrogenous base or an alkali metal, therefore, it is probable that the added salts are converted to chlorides or complex addition compounds of the chlorides with cuprous chloride or other salts existing in the system, therefore, a convenient form in which they may be added is as the chlorides. However, they may be added as oxides, hydroxides, nitrates or in the form of any suitable soluble salt.

The weight of salt added is in part a function of the salt and the nature of the catalyst used. The effectiveness increases with increase in added salt to a maximum and then again decreases, particularly through decrease in the activity of the catalyst. Thus, we have found that the addition of SnCl₂.2H₂O to a catalyst composed of 1110 gms. cuprous chloride, 545 gms. of ammonium chloride and 830 gms. of water results in improved yield of vinylacetylene up to about 100 gms. of the stannous salt, then remains at a rather constant value and is definitely decreasing with the addition of a large excess of the salt. The optimum concentration can be readily determined by one skilled in the art by carrying out experiments similar to those described above, observing the production and yield with varying concentrations of the salt. In general, we have found the optimum concentration to be less than the weight of salt required to furnish tin equivalent to 15% of the weight of cuprous chloride in the catalyst. Thus, in a catalyst containing 1000 gms. of cuprous chloride in admixture with ammonium or potassium chlorides, we wish to add not over 150 gms. of tin, which, for example would be accomplished by the addition of about 271.5 gms. of the hydrated chloride SnCl₂.2H₂O. We prefer the addition of about 100 gms. in this case.

Catalysts promoted by stannous salts, particularly the chloride, are applicable to all modifications of the vinylacetylene manufacture whether batch or continuous and particularly to the processes described in U. S. P. 1,811,959; 1,926,056; 1,876,857 and most particularly 2,048,838 and its continuation, Serial No. 78,584 which has matured into U. S. Patent No. 2,191,068. It is applicable to the various modifications of the catalyst composition such as described in U. S. Patent 1,926,055; 1,926,039 and the copending application Serial No. 131,644, filed July 2, 1937. In general this prior art teaches that cuprous salt catalysts are improved by the addition of nitrogenous bases and ammonium salts, particularly ammonium chloride.

British Patent 438,548 discloses that acetylene polymerization is promoted by cuprous salts together with salts, especially halides, of the alkali and alkaline earth metals, the latter acting as equivalents of nitrogenous bases.

Copending application 210,159 filed May 26, 1938 discloses that potassium chloride in certain proportions is particularly desirable.

Thus, it is clear that the present invention includes the promotion of cuprous salt catalysts for the non-benzenoid polymerization of acetylene either with or without the addition of other compounds such as ammonium salts, nitrogenous bases, and salts of the alkali and alkaline earth metals. Chlorides are to be preferred and ammonium and potassium chlorides are particularly preferred as additions to catalysts of copper and tin salts, which latter are also preferably chlorides.

For the sake of convenience, salts of alkali metals, salts of alkaline earth metals and ammonium salts will be hereinafter referred to collectively as alkalinous salts, and the corresponding chlorides will be referred to as alkalinous chlorides.

The manufacture of vinylacetylene according to the present invention thus results in greatly improved conversion of acetylene to polymer and, hence, both the improved process and the new catalyst are distinct advances in the art. Moreover, the purification of acetylene gives a purer product and greatly increases the useful life of the catalyst.

As is readily apparent, the invention is not limited to the specific embodiments disclosed, but the true limits are to be found in the scope of the appended claims.

I claim:

1. A process of producing non-benzenoid polymers of acetylene which comprises polymerizing acetylene, which has been purified to remove impurities having deleterious effect upon capacity and active life of catalysts in the presence of a cuprous salt and an inorganic salt of tin capable of supplying stannous ions in acid aqueous solution.

2. A process of producing non-benzenoid polymers of acetylene which comprises passing acetylene, which has been purified to remove oxygen, hydrogen sulfide, arsine and phosphine into a catalytic acid aqueous solution containing a cuprous salt and an inorganic salt of tin capable of supplying stannous ions in said acid aqueous solution.

3. A process of producing non-benzenoid polymers of acetylene which comprises polymerizing acetylene in the presence of a cuprous salt and an inorganic salt of tin capable of supplying stannous ions in acid aqueous solution.

4. A process of producing non-benzenoid polymers of acetylene which comprises polymerizing acetylene in the presence of cuprous chloride and stannous chloride.

5. A process of producing non-benzenoid polymers of acetylene which comprises polymerizing acetylene in the presence of a catalytic acid aqueous solution of a cuprous salt and an inorganic salt of tin capable of producing stannous ions in said acid aqueous solution.

6. A process of producing non-benzenoid polymers of acetylene which comprises polymerizing acetylene in the presence of an acid aqueous solution containing cuprous chloride, an inorganic salt of tin capable of supplying stannous ions in acid aqueous solution, and an alkalinous chloride.

7. A catalyst composition for the non-benzenoid polymerization of acetylene comprising cuprous chloride and stannous chloride.

8. A catalyst composition for the non-benzenoid polymerization of acetylene comprising cuprous chloride, potassium chloride and stannous chloride.

9. A catalyst composition for the non-benzenoid polymerization of acetylene comprising cuprous chloride, ammonium chloride and stannous chloride.

10. A process of polymerizing non-benzenoid polymers of acetylene which comprises polymerizing acetylene in the presence of a catalytic acid aqueous solution of a cuprous salt, an inorganic salt of tin capable of producing stannous ions in said acid aqueous solution and an alkalinous salt.

11. A process of producing non-benzenoid polymers of acetylene which comprises polymerizing acetylene in the presence of an acid aqueous solution containing cuprous chloride, an inorganic salt of tin capable of supplying stannous ions in acid aqueous solution, and a nitrogenous base.

ALBERT S. CARTER.